US011600125B1

(12) United States Patent
Hapgood et al.

(10) Patent No.: US 11,600,125 B1
(45) Date of Patent: Mar. 7, 2023

(54) AUTONOMOUS DEVICE AUTHENTICATION AND COMPARTMENT UNLOCKING

(71) Applicant: Amazon Technologies, Inc., Seattle, WA (US)

(72) Inventors: Ryan David Hapgood, Belmont (AU); Alexander Edwards, Brisbane (AU); Ryan Koscianski, Seattle, WA (US); Scott Laporte, Brisbane (AU); Michael John Neville, Bunya (AU)

(73) Assignee: Amazon Technologies, Inc., Seattle, WA (US)

( * ) Notice: Subject to any disclaimer, the term of this patent is extended or adjusted under 35 U.S.C. 154(b) by 764 days.

(21) Appl. No.: 16/414,395

(22) Filed: May 16, 2019

(51) Int. Cl.
| | |
|---|---|
| *H04L 29/06* | (2006.01) |
| *G07C 9/00* | (2020.01) |
| *H04W 12/04* | (2021.01) |
| *H04L 9/32* | (2006.01) |
| *H04W 4/80* | (2018.01) |

(Continued)

(52) U.S. Cl.
CPC ..... *G07C 9/00912* (2013.01); *G06Q 10/0836* (2013.01); *G07C 9/00309* (2013.01); *H04L 9/3228* (2013.01); *H04W 4/80* (2018.02); *H04W 12/033* (2021.01); *H04W 12/04* (2013.01); *H04W 12/041* (2021.01); *G06Q 2220/00* (2013.01); *G07C 2009/0092* (2013.01); *G07C 2009/00412* (2013.01); *H04L 2209/805* (2013.01)

(58) Field of Classification Search
CPC ............ G07C 9/00912; G07C 9/00309; G07C 2009/00412; G07C 2009/0092; G06Q 10/0836; G06Q 2220/00; H04L 9/3228; H04L 2209/805; H04W 4/80; H04W 12/033; H04W 12/04; H04W 12/041
See application file for complete search history.

(56) References Cited

U.S. PATENT DOCUMENTS

| | | | | |
|---|---|---|---|---|
| 2016/0307176 | A1* | 10/2016 | Renke | G06F 16/178 |
| 2018/0300679 | A1* | 10/2018 | Mahmood | G06Q 10/0836 |

(Continued)

FOREIGN PATENT DOCUMENTS

| | | | | |
|---|---|---|---|---|
| WO | WO-2018037453 | A1 * | 3/2018 | G06F 21/31 |
| WO | WO-2019161872 | A1 * | 8/2019 | A47G 29/141 |

*Primary Examiner* — Harunur Rashid
(74) *Attorney, Agent, or Firm* — Eversheds Sutherland (US) LLP

(57) ABSTRACT

Systems, methods, and computer-readable media are disclosed for systems and methods for autonomous device authentication and compartment unlocking. Example methods may include determining, by a user device, an identifier associated with a target Bluetooth Low Energy peripheral device, receiving a beacon from a Bluetooth Low Energy peripheral device, and determining, using the beacon, that the Bluetooth Low Energy peripheral device is the target Bluetooth Low Energy peripheral device. Example methods may include establishing a connection with the target Bluetooth Low Energy peripheral device, and sending a signal to the target Bluetooth Low Energy peripheral device to implement an action, where the signal comprises a resource identifier, and where the target Bluetooth Low Energy peripheral device controls access to a plurality of resources, and uses the resource identifier to identify a resource of the plurality of resources at which to implement the action.

19 Claims, 7 Drawing Sheets

(51) Int. Cl.
*G06Q 10/0836* (2023.01)
*H04W 12/033* (2021.01)
*H04W 12/041* (2021.01)

(56) References Cited

U.S. PATENT DOCUMENTS

2018/0350170 A1* 12/2018 Wang .................... G06F 1/3231
2020/0160324 A1* 5/2020 Mars ..................... H04L 9/3234

* cited by examiner

AUTONOMOUS DEVICE AUTHENTICATION AND COMPARTMENT UNLOCKING

BACKGROUND

User and/or device authentication may be used to authorize physical access to locations. For example, device or user authentication may be used to unlock doors, open gates, and so forth. However, such authentication may rely on user interaction. For example, a user may have to swipe a badge, type a passcode, input credentials, or otherwise interact with a system. Such interactions may cause friction in a user experience or may otherwise be cumbersome. In addition, such interactions may increase a risk of unauthorized access to locations. Accordingly, secure and autonomous device authentication may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
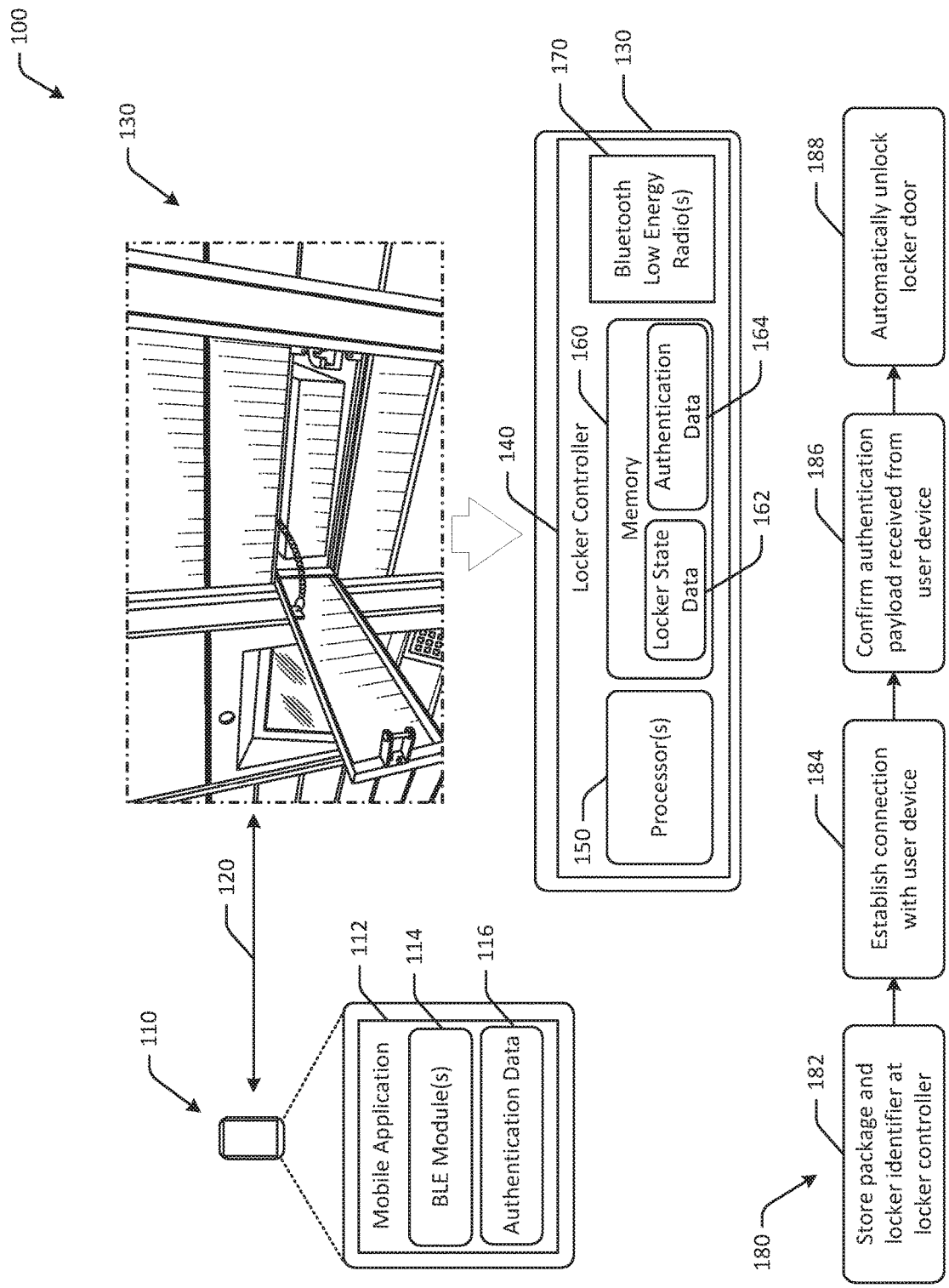
FIG. 1 is a schematic illustration of an example use case for autonomous device authentication and compartment unlocking in accordance with one or more example embodiments of the disclosure.

Device and/or user authentication may be used to authenticate a device and/or a user of the device, and may be used to provide access to computer systems, physical locations, and other protected spaces. For example, an RFID badge or a smartphone may be used to provide a user access to an area protected by a locked door, or to a computer system. The authentication process may include user interaction. For example, a user may have to swipe the badge, enter a code, unlock a smartphone, interact with a security system, and so forth in order to gain access. Such user interactions may negatively impact a user experience, and may also decrease security as a result of an unauthorized person obtaining a badge or watching a passcode being entered, etc. Accordingly, a user experience may be improved, and security may be increased, by autonomous device authentication and compartment unlocking.

In an example, a locker system may be used to deliver packages or other items, which may later be picked up by recipients. To access their packages or items, recipients may have to provide authentication information, such as a scannable code, a passcode, or other credentials. However, certain embodiments of the disclosure include locker systems that autonomously authenticate user devices, and automatically unlock lockers without user interaction with the user device or locker system, thereby improving the user experience with the locker system and reducing the likelihood of an unauthorized person gaining access to the locker.

To autonomously authenticate devices, some embodiments may use a combination of Bluetooth Low Energy beacons and peripheral devices. The locker systems may connect to a user device using a Bluetooth Low Energy connection, receive an authentication payload, authenticate the device, and cause the appropriate locker door to be unlocked, such that a user of the device can access the contents.

Bluetooth Low Energy is a communication protocol that may allow devices to communicate without a network connection. Devices may have profiles that define the manner in which other devices may communicate with the device. Bluetooth devices may include attribute tables, such as a generic attribute profile (GATT) that may include services, characteristics, and/or descriptors. Services may include one or more characteristics. Characteristics may be data that relates to a particular internal state of the device, such as a current battery level, or may include customized information. In some embodiments, characteristics may be used to communicate authentication payloads from a user device to the locker system. In some instances, characteristics may be used to communicate peripheral identifiers or locker unlocking abilities to user devices. Characteristics can be designated as read, write, or notify. A read only characteristic may be communicated to a user device, a write characteristic may allow a user device to change the value in the characteristic (e.g., write an authentication payload, etc.), and a notify characteristic may be used to periodically communicate with the peripheral. When connected to a user device, the user device may be a GATT client, and the peripheral may be the GATT server.

Embodiments of the disclosure include systems and methods for autonomous device authentication and compartment unlocking. Certain embodiments may include locker systems that autonomously authenticate devices and unlock compartments, such as lockers, for which the user device is authorized to access. For example, if a delivery for the user device is placed in a certain locker at the locker system, the locker system may unlock the locker after authenticating the user device. As a result, users may not have to interact with their user device, such as a smartphone, or with the locker system in order to access the locker in which the user's delivery is placed. A user experience with the locker system may therefore be relatively frictionless, and security may be increased due to reduced user interaction and potential for theft of credential information.

This disclosure relates to, among other things, devices, systems, methods, computer-readable media, techniques, and methodologies for autonomous device authentication and compartment unlocking. Certain embodiments include computer systems, such as controllers, and Bluetooth Low Energy peripheral devices at locker systems to autonomously connect with and authenticate user devices, and to provide access to compartments after authentication. Some embodiments may combine multiple Bluetooth Low Energy technologies (e.g., beacons and Bluetooth Low Energy peripheral devices, etc.) to provide a fully automated package pickup experience with offline locker systems. For example, in some embodiments, a beacon may be used near a locker system to allow user devices to efficiently monitor for proximity to the locker system, and to trigger or initiate a mobile application when nearby. The mobile application may be configured to scan for a special Bluetooth Low Energy peripheral device (which may be the locker system controller). The mobile application may connect and send authentication information to the locker system controller without any user interaction or network connectivity (even when the mobile application is in a terminated state). For example, even if mobile application is closed, location permissions at the operating system level of the user device may allow for regions that are configured on the device, and the mobile application may still be initiated, thereby allowing a background Bluetooth Low Energy connection from a terminated application state.

Referring to FIG. 1, an example use case 100 for autonomous device authentication and compartment unlocking is depicted in accordance with one or more example embodiments of the disclosure. In FIG. 1, a user device 110 may be used by a user to automatically authenticate the user device and to access a locker at a locker system 130. The locker system 130 may be a set of one or more compartments or lockers in which packages or other items may be placed. Recipients of the packages or items may access the respective lockers and obtain their packages. For example, a delivery person may deliver packages or orders for users to the locker system 130, and recipients of the packages may obtain their packages from the locker system 130.

The user device 110 may include one or more mobile applications 112, which may include one or more Bluetooth Low Energy modules 114 configured to scan for nearby and/or available Bluetooth Low Energy peripheral devices, and authentication data 116. The authentication data 116 may be an encrypted temporal authentication key or token used to authenticate the user device 110 at the locker system 130, and to cause the locker system 130 to unlock or open a locker door associated with an order or package for the user. The user may thereafter access the locker.

The locker system 130 may include a locker controller 140, which may include one or more computer processors 150 and memory 160. The locker controller 140 may be a computer system configured to control one or more functions at the locker system 130. Locker state data 162 and authentication data 164 may be stored on the memory 160. The locker system 130 may be an offline locker system, and may therefore not be connected to the internet or any public network. The locker state data 162 may represent an occupied or unoccupied state of individual lockers at the locker system 130, as well as package identifiers, order identifiers, user account identifier, and/or other data regarding contents of lockers and/or access logs for users that accessed lockers. The authentication data 164 may be used by the locker system 130 to authenticate user devices (e.g., by comparing authentication data received from a user device, etc.). The locker system 130 may include one or more Bluetooth Low Energy radios 170 configured to facilitate communication with devices over a Bluetooth Low Energy connection.

To autonomously authenticate devices and unlock compartments, the locker system 130, or more specifically the locker controller 140, may implement a process flow 180. At a first block 182, a package identifier and associated locker identifier may be stored at the locker controller 140. For example, when a delivery person loads a package or delivery into a particular locker, the delivery person may communicate the location of the package to the locker controller 140 using a delivery person device. The information may be communicated over a Bluetooth or Bluetooth Low Energy connection. Accordingly, the locker controller 140 may store the package information in association with the locker identifier. Additional information, such as order information, user account information, and other data related to the package may also be stored at the locker controller 140.

After the package is delivered to the locker system 130, a notification of delivery may be sent to the user device 110. The notification may include a beacon region or geofence region associated with the location of the locker system 130. For example, the geofence region may be a five meter radius about the locker system 130. The geofence region may be used by the user device 110 to determine when to initiate the mobile application 112 in a background mode. In the background mode, the mobile application 112 may not have a user interface presented at the user device 110. The notification may include a target Bluetooth Low Energy peripheral device identifier, such as an identifier for the Bluetooth Low Energy radio 170. The mobile application 112, when initiated, may scan for the identifier of the Bluetooth Low Energy radio 170.

The locker system 130 may continuously broadcast, or otherwise send or emit, Bluetooth Low Energy beacons using the Bluetooth Low Energy radio 170. The Bluetooth Low Energy beacons may advertise the presence of the locker system 130. The Bluetooth Low Energy beacon may include an unlock characteristic that may be used by the user device 110 to determine that the locker system 130 has unlock functionality.

At a second block 184, the locker system 130 may establish a connection with the user device 110. For example, after the user device 110 crosses the geofence into proximity of the locker system 130, or is otherwise within a beacon region of the locker system 130, the user device 110 may trigger or initiate the mobile application 112, which may determine that the identifier of the Bluetooth Low Energy radio 170 matches the identifier of the Bluetooth Low Energy peripheral that the user device 110 is searching for. In some embodiments, the user device 110 may determine that the Bluetooth Low Energy radio 170 is the Bluetooth Low Energy peripheral device of interest due to an unlock characteristic associated with the Bluetooth Low Energy radio 170. The connection between the locker system 130 and the user device 110 may be established without pairing. The connection may be established using a handshake process between the Bluetooth Low Energy radio 170 and the user device 110.

At a third block 186, the locker system 130 may confirm an authentication payload received from the user device 110. For example, the locker system 130 may receive the authentication payload or data 116 from the user device 110 after a connection is established. To communicate the authentication data 116, in some embodiments, the user device 110 may send a generic attribute characteristic to the Bluetooth Low Energy radio 170 of the locker system 130, where the generic attribute characteristic includes the authentication data 116, such as an encrypted temporal authentication key. The locker system 130 may determine that the authentication data 116 is confirmed, or matches an expected value. The user device 110 may disconnect from the Bluetooth Low Energy radio 170 after sending the authentication data 116. The connection between the locker system 130 and the user device 110, as well as the communication of the authentication data 116, may take place without user interaction with either the user device 110 or the locker system 130, and may occur as the user approaches the locker system 130. The authentication data 116 may include a hash of a salt value, user account identifier, order identifier, a current time, and/or other data. The authentication data 116 may therefore be a temporal key that can be recreated by the locker system 130.

At a fourth block 188, the locker system 130 may automatically unlock the locker door. For example, the locker system 130 may determine the locker door associated with the authentication data 116 (e.g., the locker in which the user's order or package is located, etc.), and may cause the corresponding locker door to be unlocked or opened. The user may therefore obtain the contents of the locker without interacting with the user device 110 or the locker system 130 during the process.

After the package is picked up and the locker door is closed, the locker system 130 may determine that the locker door is closed, and the next time the delivery user device is connected to the locker system, the locker system 130 may send a notification indicating that the package has been picked up.

In some embodiments, user devices may authenticate each other using a similar process, instead of authentication by a computer system at a locker. For example, one device may be a peripheral, and the other may be a central device, such that credentials may be exchanged over a Bluetooth Low Energy connection. This process may be transparent to users, and may be used to authenticate users for user identification in one example. In addition, in some instances, the mobile application 112 may generate an interactive notification that can be used by the user to approve a connection to a particular locker system. For example, if the user wants to delay opening of the locker, the user may interact with the notification when the user is ready instead of automatically opening the locker as the user approaches.

Example embodiments of the disclosure provide a number of technical features or technical effects. For example, in accordance with example embodiments of the disclosure, certain embodiments of the disclosure may automatically establish connections between devices, autonomously unlock compartment doors, and automatically validate user devices. As a result of improved functionality, a number of user interactions needed to access lockers may be reduced, thereby improving functionality of computer systems. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
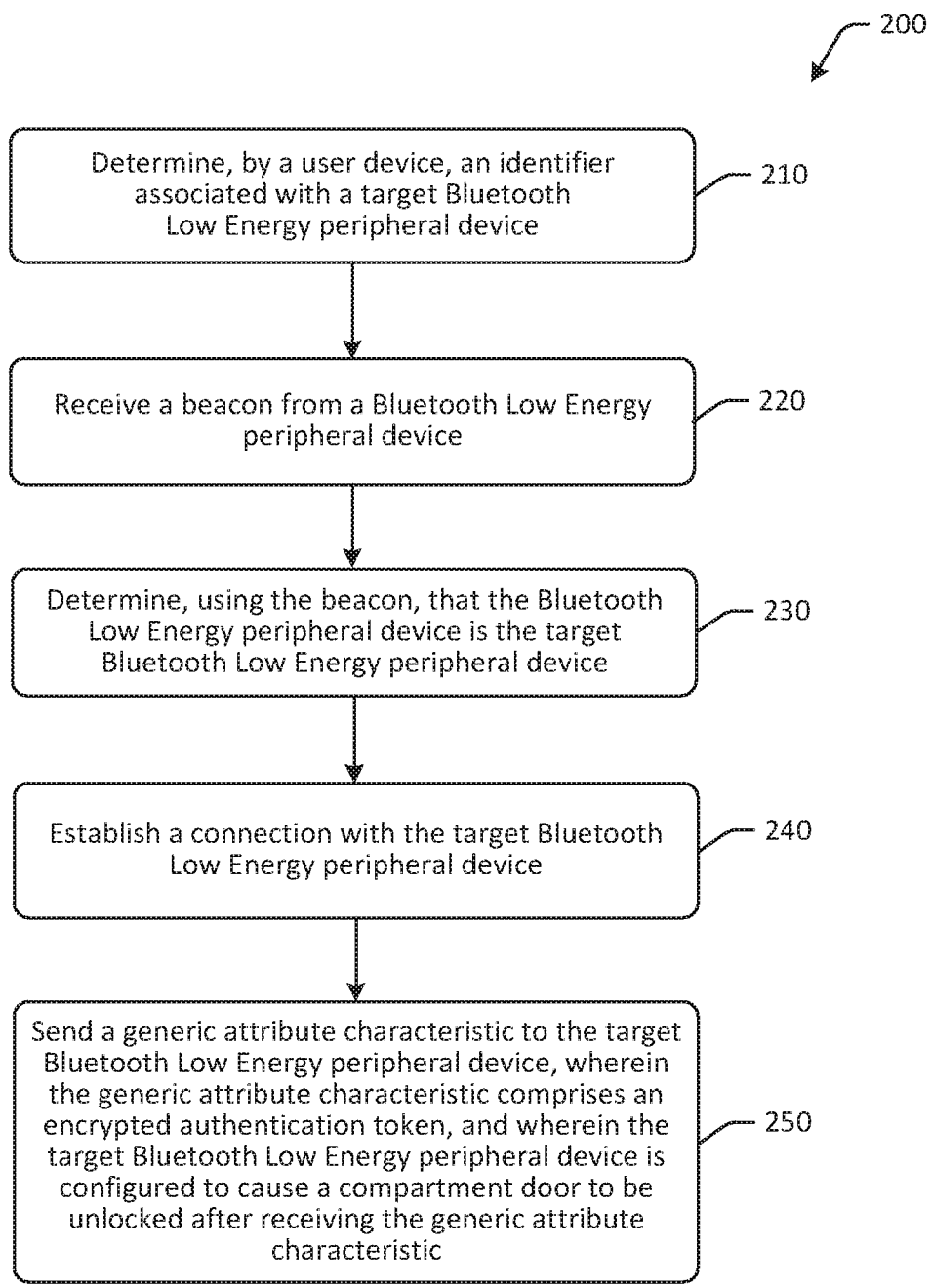
FIG. 2 is a schematic illustration of an example process flow for autonomous device authentication and compartment unlocking in accordance with one or more example embodiments of the disclosure.

FIG. 2 is a schematic illustration of an example process flow 200 for autonomous device authentication and compartment unlocking in accordance with one or more example embodiments of the disclosure. While example embodiments of the disclosure may be described in the context of locker systems, it should be appreciated that the disclosure is more broadly applicable to various types of devices with compartments, and/or device-to-device authentication. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a user device, may be executed to determine an identifier associated with a target Bluetooth Low Energy peripheral device. For example, one or more modules at a user device may determine an identifier associated with a target Bluetooth Low Energy peripheral device. The identifier may be used to identify a particular Bluetooth Low Energy peripheral device, such as a Bluetooth Low Energy peripheral device that is located at a particular locker system. The target Bluetooth Low Energy peripheral device may be a Bluetooth Low Energy peripheral device that is located at, or otherwise associated with, a particular locker system. In some embodiments, the identifier may be determined by a remote server and sent to the user device. In such instances, the identifier may be received by the user device. For example, the remote server may determine the locker system at which the package is located for pickup, determine the identifier associated with a Bluetooth Low Energy peripheral device at the locker system, and send the identifier to the user device. In other instances, the user device may determine the identifier locally. For example, the user device may determine an identifier associated with a particular locker system designated for package pickup. In some embodiments, the user device may receive a notification indicating that a package is ready for pickup at a locker system, and the locker system may include the identifier. The user device may use the identifier to determine whether the target Bluetooth Low Energy peripheral device is present or otherwise available when scanning for nearby or available Bluetooth Low Energy peripheral devices. For example, scanning for available Bluetooth Low Energy peripheral devices may result in the identification of identifies of various Bluetooth Low Energy peripheral devices. The user device may use the identifier to determine whether the target Bluetooth Low Energy peripheral device is available for connection. In some embodiments, the user device may initiate scanning for Bluetooth Low Energy peripheral devices after certain user device location parameters are satisfied, such as the user device being within a certain geographic region or geofence.

For example, the user device may initiate an application that searches or scans for the identifier after the user device determines that the user device is within a certain geographic region. The geographic region and/or user device location may be determined using GPS coordinates, connected wireless networks, cellular data, or any suitable location detection system. The locker system and/or the target Bluetooth Low Energy peripheral device may be an offline device, and may therefore not be connected to the internet and/or a public network.

At block 220 of the process flow 200, computer-executable instructions stored on a memory of a device, such as a user device, may be executed to receive a beacon from a Bluetooth Low Energy peripheral device. For example, one or more modules at a user device may receive a beacon from a Bluetooth Low Energy peripheral device. The user device may initiate a mobile application in a background mode. In some embodiments, the mobile application may be initiated after the user device is in a certain geofence area. The mobile application may execute in background mode, such that its execution is invisible to a user device and/or there is no user interface presented at the user device that is associated with the mobile application. In some instances, the mobile application may be software code that executes as a background process or an operating system level process. As a result, the mobile application may be initiated once the user device is in the geofence region regardless of whether the user device is restarted and/or the mobile application is closed.

The Bluetooth Low Energy peripheral device may emit beacons or otherwise advertise its presence periodically. The user device may receive a beacon from the Bluetooth Low Energy peripheral device. The beacon may include information related to the Bluetooth Low Energy peripheral device, such as an identifier of the Bluetooth Low Energy peripheral device, a profile indicating the types of services and/or characteristics associated with the Bluetooth Low Energy peripheral device, and/or other data.

At block 230 of the process flow 200, computer-executable instructions stored on a memory of a device, such as a user device, may be executed to determine, using the beacon, that the Bluetooth Low Energy peripheral device is the target Bluetooth Low Energy peripheral device. For example, one or more modules at a user device may determine, using the beacon, that the Bluetooth Low Energy peripheral device is the target Bluetooth Low Energy peripheral device. The user device may determine the identifier of the Bluetooth Low Energy peripheral device from which the beacon was received, and may compare that identifier to the identifier of the target Bluetooth Low Energy peripheral device. The user device may determine whether the identifiers match. If it is determined that the identifiers match, the user device may determine that the Bluetooth Low Energy peripheral device is the target Bluetooth Low Energy peripheral device.

At block 240 of the process flow 200, computer-executable instructions stored on a memory of a device, such as a user device, may be executed to establish a connection with the target Bluetooth Low Energy peripheral device. For example, one or more modules at a user device may establish a connection with the target Bluetooth Low Energy peripheral device. The connection between the user device and the target Bluetooth Low Energy peripheral device may be in the form of a central device and peripheral device, where the user device is the central device, and the target Bluetooth Low Energy peripheral device is the peripheral device. The connection may allow data to be sent from the user device to the target Bluetooth Low Energy peripheral device, and/or from the target Bluetooth Low Energy peripheral device to the user device. In some embodiments, two-way communication may be enabled over the connection. In some embodiments, although the user device may be connected to the target Bluetooth Low Energy peripheral device over a Bluetooth Low Energy connection, the user device may not be paired with the target Bluetooth Low Energy peripheral device. As a result, data communicated between the user device and the target Bluetooth Low Energy peripheral device may be public in some instances. In some embodiments, a pairing process of exchanging security features between the user device and the target Bluetooth Low Energy peripheral device may not be needed.

At block 250 of the process flow 200, computer-executable instructions stored on a memory of a device, such as a user device, may be executed to send a generic attribute characteristic to the target Bluetooth Low Energy peripheral device, wherein the generic attribute characteristic comprises an encrypted authentication token. For example, one or more modules at a user device may send a generic attribute characteristic to the target Bluetooth Low Energy peripheral device. The generic attribute characteristic may include an encrypted authentication token. The user device may send the encrypted authentication token in the form of a generic attribute characteristic to the target Bluetooth Low Energy peripheral device over the Bluetooth Low Energy connection. The encrypted authentication token may be an authentication payload that can be used by the target Bluetooth Low Energy peripheral device to determine whether to authenticate the user device. For example, the target Bluetooth Low Energy peripheral device may receive the encrypted authentication token, and may decrypt the encrypted authentication token. The target Bluetooth Low Energy peripheral device and/or a connected computer system, such as a locker controller, may determine whether the decrypted authentication token is associated with any order identifiers and/or locker identifiers for lockers at the locker system. If it is determined that the authentication token is associated with an order identifier and/or locker identifier, the target Bluetooth Low Energy peripheral device and/or connected computer system may be configured to cause a compartment door to be unlocked after receiving the generic attribute characteristic. For example, the locker controller may cause one or more locker doors to be automatically unlocked and/or opened after receiving the encrypted authentication token. In some embodiments, the target Bluetooth Low Energy peripheral device may be integrated with the locker controller.

In some embodiments, instead of, or in addition to, sending the generic attribute characteristic to the target Bluetooth Low Energy peripheral device, the user device may send a signal to the target Bluetooth Low Energy peripheral device to implement an action, where the target Bluetooth Low Energy peripheral device controls access to a plurality of resources. The signal may include a resource identifier, such as a locker identifier, an order identifier, a user account identifier, a device identifier, and/or another identifier or combination of identifiers, and the target Bluetooth Low Energy peripheral device may use the resource identifier to identify a resource of the plurality of resources at which to implement the action, such as a locker identifier for which to provide access. For example, the plurality of resources may be a number of products, items, compartments, or other resources. The action may therefore include providing access to a resource identified during a connection process, such as a handshake process, between the user device and the target Bluetooth Low Energy peripheral device. In some instances, sending the signal to the target Bluetooth Low Energy peripheral device to implement the action may include sending a generic attribute characteristic to the target Bluetooth Low Energy peripheral device.

The user device may automatically disconnect from the target Bluetooth Low Energy peripheral device after sending the generic attribute characteristic. In some embodiments, the user device may disconnect form the target Bluetooth Low Energy peripheral device before receiving confirmation of authentication or another message from the target Bluetooth Low Energy peripheral device.

As a result, a user with the user device may approach the locker system, and the user device may autonomously detect and communicate the target Bluetooth Low Energy peripheral device (and/or locker controller) to cause a locker door associated with an order that is to be picked up by the user to be automatically opened and/or unlocked. The user may therefore not have to actively interact with the user device, the target Bluetooth Low Energy peripheral device, or any other component of the locker system. Rather, the user may simply approach the locker system, find the locker door that was automatically unlocked or opened, and remove the package inside the locker.

In some embodiments, the target Bluetooth Low Energy peripheral device may be connected to the internet. In such instances, authentication payloads may be verified by one or more remote servers, and operation of the locker doors and/or other components may be controlled by the remote server instead of the locker controller.

Figure 3:
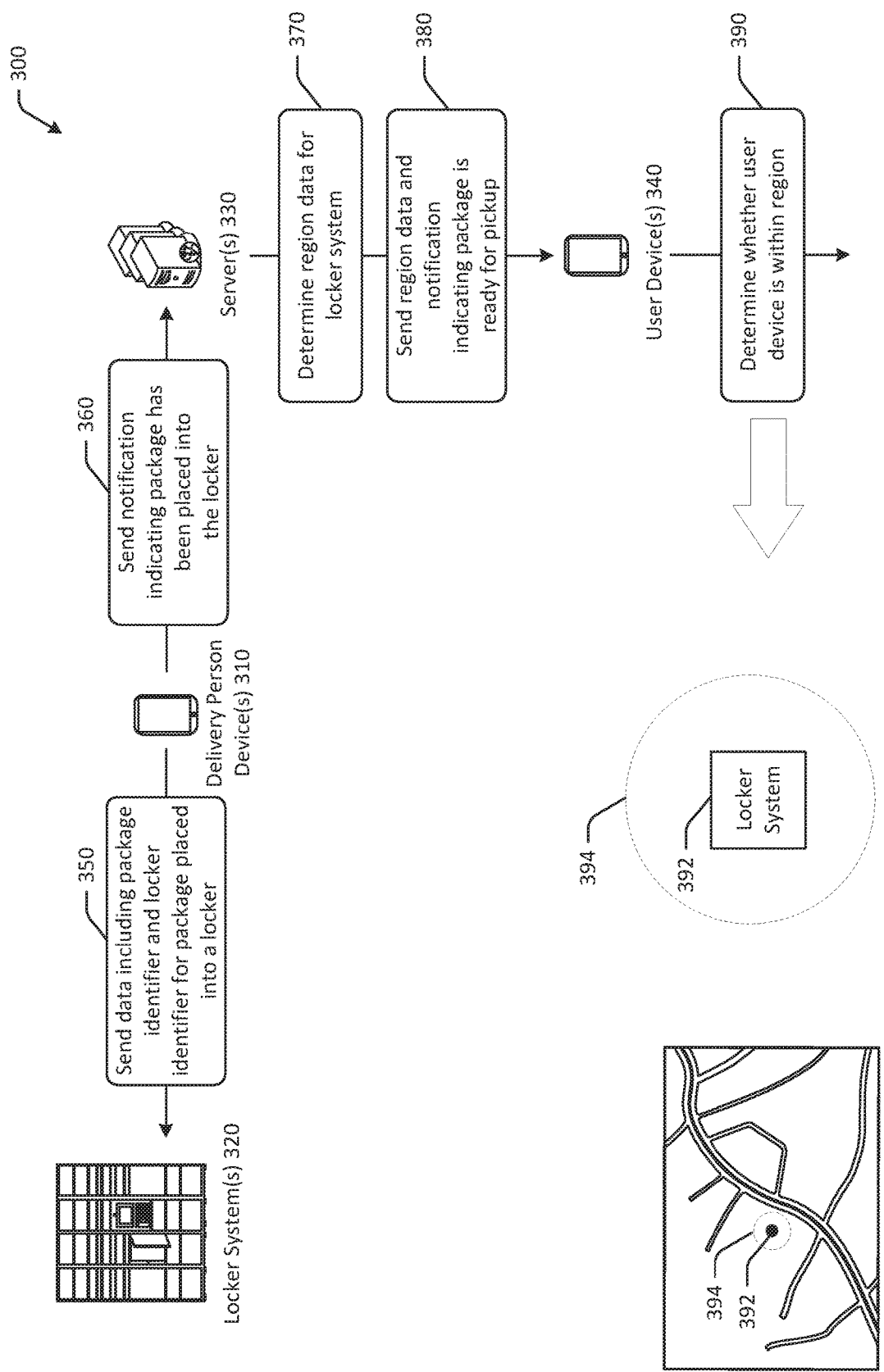
FIG. 3 is a schematic illustration of an example data and operation flow for autonomous device authentication and compartment unlocking in accordance with one or more example embodiments of the disclosure.

FIG. 3 is a schematic illustration of an example data and operation flow 300 for autonomous device authentication and compartment unlocking in accordance with one or more example embodiments of the disclosure. While example embodiments of the disclosure may be described in the context of lockers and smartphones, it should be appreciated that the disclosure is more broadly applicable to any type of compartment and user device, as well as user device-to-user device authentication. Some or all of the blocks of the process flows in this disclosure may be performed in a distributed manner across any number of devices. Some of the data flow or operations may be optional and may be performed in a different order. FIG. 3 may be an example data and operation flow during a region determination and subsequent geofence determination process.

In FIG. 3, one or more delivery person devices 310 may be in communication with one or more locker systems 320, and one or more servers 330. The delivery person device 310 may be any suitable user device, such as a smartphone, tablet, laptop, or other computer device. The delivery person device 310 may be a device used by a delivery person, such as a package delivery person. For example, the delivery person may deliver packages to the locker system 320 by placing packages into lockers at the locker system. The packages may be picked up from the locker system 320 by the recipient.

The locker system 320 may be an offline locker system and may include one or more lockers in which packages or other items can be placed. Each of the lockers in the locker system 320 may have a locker identifier used to identify the respective locker. Each locker may have a door or access point that can be opened or unlocked to place packages in and/or remove packages from the locker. The locker system 320 may include a computer system, such as a controller, that may control one or more aspects of the locker system 320. For example, the computer system may be used to unlock or otherwise provide access to a particular locker, and may track individual locker states (e.g., locker states may indicate whether a particular locker is occupied or unoccupied, etc.). The computer system may also track which packages and/or deliveries/orders are placed into which lockers, such that when a package recipient arrives to obtain their packages/orders, the computer system may unlock or open the correct locker door. The locker system 320 may include a Bluetooth and/or Bluetooth Low Energy radio for wireless communication. In some instances, the locker system 320 may include a Bluetooth Low Energy radio that is setup as a Bluetooth Low Energy peripheral device with a Bluetooth Low Energy peripheral device identifier.

When the delivery person arrives at the locker system 320 to deliver packages, the delivery person may place packages into individual lockers at the locker system 320. Using the delivery person device 310, the delivery person may communicate which packages or orders are placed into which lockers to the locker system 320. For example, the delivery person may use the delivery person device 310 to connect to the computer system at the locker system 320 over a Bluetooth or Bluetooth Low Energy connection. The wireless connection may be any suitable personal area network. When the delivery person device 310 and the locker system 320 are connected, the delivery person may indicate that a certain package is placed in a certain locker. For example, the delivery person may scan, using the delivery person device 310, a package identifier and a locker identifier, and may communicate the package identifier and locker identifier to the locker system 320. The locker system 320 may receive the data and store the package identifier and locker identifier in association with each other, indicating that the package associated with the package identifier is placed in the locker associated with the locker identifier. The association may remain until the package is removed from the locker, after which the locker identifier may be designated as unoccupied. Accordingly, at a first operation 350, the delivery person device 310 may be used by the delivery person to send data including a package identifier, an order identifier (e.g., order identifier associated with the package identifier, etc.), a user identifier (e.g., a user account identifier associated with the package or order, etc.), and/or a locker identifier for a package placed into a locker to the locker system 320. In some embodiments, the delivery person device 310 may send an authentication key or authentication payload to the locker system 320 that can be used to retrieve the package by the recipient. In other instances, the computer system at the locker system 320 may determine an authentication key for packages using any combination of data received from the delivery person device 310 regarding the package delivery (e.g., user account data, order data, package data, etc.), as well as current time data, and/or hash values (e.g., salt values, etc.) for encryption. The locker system 320 may therefore determine which packages have been delivered to the locker system 320, and the positioning of the packages within the locker system 320.

At a second operation 360, the delivery person device 310 may send a notification to the server 330 indicating that the package has been placed into the locker. In some instances, the delivery person device 310 may automatically send the notification after the locker identifier is determined. Because the locker system 320 may be offline, the locker system 320 may not be in communication with the server 330 in some embodiments.

At a third operation 370, the server 330 may determine region data for the locker system 320. Region data may be indicative of proximity to a beacon emitted by a component of the locker system 320, or an associated device. For example, the server 330 may receive the notification from the delivery person device 310. The server 330 may determine, using the notification, that the package has been delivered, and may determine a locker system identifier associated with the locker system 320. Using the locker system identifier, the server 330 may determine a location, such as a geographic location, of the locker system 320. For example, each locker system identifier may be associated with a particular location in a database, and the server 330 may query the database to determine the location associated with the locker system 320. Using the location, the server 330 may determine region data for the locker system 320. The region data may be used to generate or determine a geofence about the locker system 320. For example, the region data may indicate that a geofence with a radius of five meters about the location of the locker system 320 is to be generated. In some instances, the region data may indicate GPS coordinates of the locker system 320, along with instructions indicating that a geofence surrounds the GPS coordinates at a certain predetermined radius, such as about 15 feet, or another value. In another instance, as illustrated in FIG. 3, the region data may indicate proximity to the locker system 392 based at least in part on beacons emitted by the locker system 320 and/or an associated device. The server 330 may determine a Bluetooth Low Energy peripheral device identifier associated with a Bluetooth Low Energy peripheral device at the locker system 320. The Bluetooth Low Energy peripheral device identifier may be sent to the user device 340 as part of the notification or separately. The Bluetooth Low Energy peripheral device identifier may be a target Bluetooth Low Energy peripheral device for the user device 340 to scan for once the user device crosses into the region and/or geofence.

At a fourth operation 380, the server 330 may send region data and/or a notification indicating the package is ready for pickup to one or more user devices 340. For example, the server 330 may be in wireless communication with the user device 340. The user device 340 may be associated with a user account that placed the order for which the package was delivered. The user device 340 may receive the notification and may therefore notify the user of the user device that the package is available for pickup at the locker system 320. The user device 340 may receive an order pickup notification that may include one or more locker system identifier (e.g., the locker system identifier, the locker identifier, a Bluetooth Low Energy peripheral identifier, and/or another identifier). The order pickup notification may indicate that an order is ready for pickup. In some embodiments, the order pickup notification may include an identifier associated with the Bluetooth Low Energy peripheral device, as well as geofence data associated with a location of the offline locker system.

The user device 340 may use the region data to implement or determine a geofence. A geofence may be a geographic region that cause the user device 340 to take a certain action when the user device 340 crosses a defined geographic or region boundary. Geofences may therefore be virtual geographic boundaries that may be defined by GPS or RFID values, and may enable software to trigger a response when a device enters or leaves a particular area.

At a fifth operation 390, the user device 340 may determine whether the user device is within the region. For example, the user device 340 may determine whether the user device 340 is within range of a specific beacon. In another example, the user device 340 may monitor a user device location to determine whether the user device is within the region defined by the region data. For example, the user device 340 may receive the region data from the server 330, and may initiate monitoring of the user device location to determine whether the user device 340 is within the region. For example, as illustrated in FIG. 3, a location 392 of the locker system 320 may be along a certain road, and a geofence 394 may be a region having a radius (or any other geometry) about the location 392. When the user device 340 determines that the user device 340 has crossed the geofence 392 (e.g., using a location of the user device 340, etc.), the user device 340 may initiate or implement one or more actions, such as that described with respect to FIG. 4. Accordingly, as a user device moves closer to the locker system 320 to pick up the package, the user device may eventually cross the geofence 392. When the user device 340 is determined to cross the geofence 392, the user device 340 may initiate monitoring or scanning for a Bluetooth Low Energy peripheral device that matches the Bluetooth Low Energy peripheral device identifier. Scanning for the Bluetooth Low Energy peripheral device identifier may be performed using a background process that may not be perceptible to a user of the user device 340. In some embodiments, the user device may determine that the user device is within a predetermined distance of an offline locker system using geofence data, and may trigger a software application at the user device, where the software application causes the user device to scan for the identifier associated with a particular Bluetooth Low Energy peripheral device.

Figure 4:
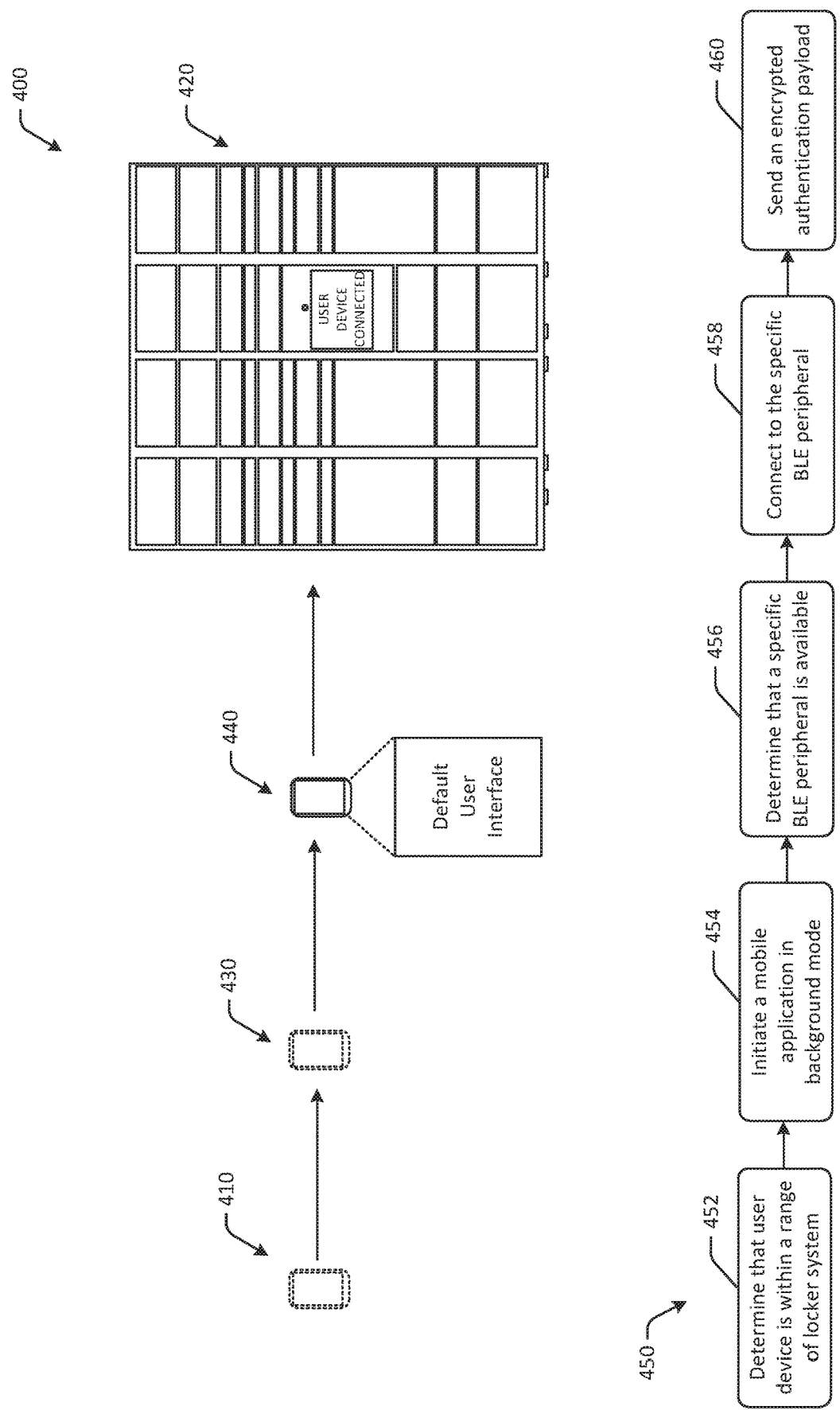
FIG. 4 is a hybrid schematic illustration of an example use case and process flow for autonomous device authentication and compartment unlocking in accordance with one or more example embodiments of the disclosure.

FIG. 4 is a hybrid schematic illustration of an example use case and process flow 400 for autonomous device authentication and compartment unlocking in accordance with one or more example embodiments of the disclosure. While example embodiments of the disclosure may be described in the context of lockers and smartphones, it should be appreciated that the disclosure is more broadly applicable to any type of compartment and user device, as well as user device-to-user device authentication. Some or all of the blocks of the process flows in this disclosure may be performed in a distributed manner across any number of devices. Some of the data flow or operations may be optional and may be performed in a different order. FIG. 4 may be an example data and operation flow during a locker approach and device authentication process.

In FIG. 4, a user device 410 may physically approach a locker system 420. The user device 410 may be the same user device discussed with respect to FIGS. 1-3, and the locker system 420 may be the locker system discussed with respect to FIGS. 1-3. After the user of the user device 410 is notified that the user's package or delivery is available for pickup, the user may approach the locker system 410, and, by extension, the user device 410 may approach the locker system 420.

For example, the user device 410 may receive an order pickup notification, or any notification indicating that the package or delivery can be picked up. The notification may indicate that the package is available at the locker system 410. The user device 410 may determine region data associated with the locker system 410. The region data may be received from a server or may be determined locally. After the user device 410 determines the region data, the user device 410 may initiate monitoring of the user device location to determine whether the user device 410 has crossed a geofence, or into the region defined by the region data.

When the user device 410 crosses the geofence or otherwise crosses into the region defined by the region data, the user device 410 may implement a process 450 to automatically connect to the locker system 420 and cause the locker system 420 to unlock or open the door in which the package for the user is located.

At block 452 of the process flow 400, the user device 410 may determine that the user device 410 is within range of a locker system. In some embodiments, the user device 410 may determine that the user device 410 is within range of a specific beacon. In another example, the user device 410 may determine, using locations permissions, the user device operating system or a native location service executing on the user device 410 may determine that a location of the user device is within a certain region or geofence. In some embodiments, the user device 410 may determine a geofence region corresponding to a particular locker system, such as the locker system 420, and/or a particular Bluetooth Low Energy peripheral device.

At block 454, the user device 410 may initiate a mobile application in background mode. The mobile application may be software code or a standalone application that does not have a user interface presented to the user when initiated. The user may therefore not see any change to a user interface of the user device 410 when the mobile application is initiated in the background mode. The mobile application may be configured to execute software code that identifies available Bluetooth Low Energy peripheral devices that are available for connection, and determines whether a specific Bluetooth Low Energy peripheral device is available. For example, the mobile application may determine a set of available Bluetooth Low Energy peripheral devices, and may determine whether the identifier of the target Bluetooth Low Energy peripheral device is in the set of available Bluetooth Low Energy peripheral devices. The target Bluetooth Low Energy peripheral device identifier may be received from a server, and/or may be determined by the user device 410 based at least in part on the locker system identifier. The mobile application may therefore be configured to identify available Bluetooth Low Energy peripheral devices, or peripheral devices nearby that are available for connection to the user device 410. The mobile application may, in some embodiments, be configured to scan for a particular identifier, such as an identifier of a Bluetooth Low Energy peripheral device that is associated with the locker system 420. In some embodiments, to remain unobtrusive and/or to fully automate the process of unlocking and/or opening the locker for the user, a user interface associated with the mobile application may not be presented at the user device 410 while the mobile application is in the background mode.

At block 456, the user device 410 may determine that a specific Bluetooth Low Energy peripheral device is available. For example, the Bluetooth Low Energy peripheral device at the locker system 420 may emit beacons advertising its presence and/or availability for a connection. The user device 410 may receive the beacon, and, using the beacon, may determine that an identifier associated with the Bluetooth Low Energy peripheral device is a specific Bluetooth Low Energy peripheral device identifier for which the mobile application is scanning or searching.

At block 458, the user device 410 may connect to the specific Bluetooth Low Energy peripheral device. To connect to the Bluetooth Low Energy peripheral device, the user device 410 may establish a connection with the user device 410 as a central device, and with the Bluetooth Low Energy peripheral device as a peripheral device. The user device 410 and/or the Bluetooth Low Energy peripheral device may use characteristic values to send and/or receive data.

At block 460, the user device 410 may send an encrypted authentication payload to the Bluetooth Low Energy peripheral device at the locker system 420. The encrypted authentication payload may be sent to the Bluetooth Low Energy peripheral device as a characteristic value. The encrypted authentication payload may be encrypted using one or more hashing functions, or any other suitable encryption technique. The authentication payload may include one or more of a device identifier, a user account identifier, an order identifier, a locker identifier, a current time, a salt value (e.g., a randomly generated value, etc.), and/or other values that may be used for authentication and to provide access to a certain locker. In some embodiments, the user device 410 may receive the encrypted authentication token from a remote server, and may send the encrypted authentication token to the locker system 420. In other instances, the user device 410 may determine or generate the encrypted authentication token using one or more of a current time, a user identifier, an order identifier, and/or a salt value. For example, the user device 410 may determine the encrypted authentication token using a current time, where the target Bluetooth Low Energy peripheral device is also configured to use the current time to authenticate the encrypted authentication token.

The authentication payload may be decrypted by the locker system 420 (e.g., locker system controller, etc.), and may be used to autonomously authenticate the user device 410 and to unlock and/or open a compartment door, such as a locker door associated with an order identifier. Accordingly, the authentication payload may be received by the locker system 420 after the connection to the Bluetooth Low Energy peripheral device is established with the user device 410. The locker system 420 may determine that the authentication payload is authenticated, and may determine that the user device is authorized to access a certain locker. The locker system 420 may therefore unlock, or cause to be unlocked, a locker door associated with a particular order identifier, device identifier, user account identifier, and/or another value. In some instances, authentication may be completed using information provided to the locker system 420 by the user device 410 and locally stored information.

Accordingly, as illustrated in FIG. 4, as the user device 410 moves from a first position 430 to a second position 440, or otherwise approaches the locker system 420, the user device 410 may passively initiate a mobile application to search for a specific peripheral device that is associated with the locker system 420, while a default user interface, such as a home screen, remains presented at a display of the user device 410. After the mobile application is initiated and the peripheral device is identified, a connection may be established, an indication of which may optionally be presented at a display of the locker system 420. The user device 410 may send the authentication payload to the locker system 420, which may autonomously authenticate the device and unlock or open a compartment, such as a locker door, such that a user may access the locker contents. As a result, a user may not have to interact with the user device 410 or the locker system 420 in order to access the locker associated with the user order.

Figure 5:
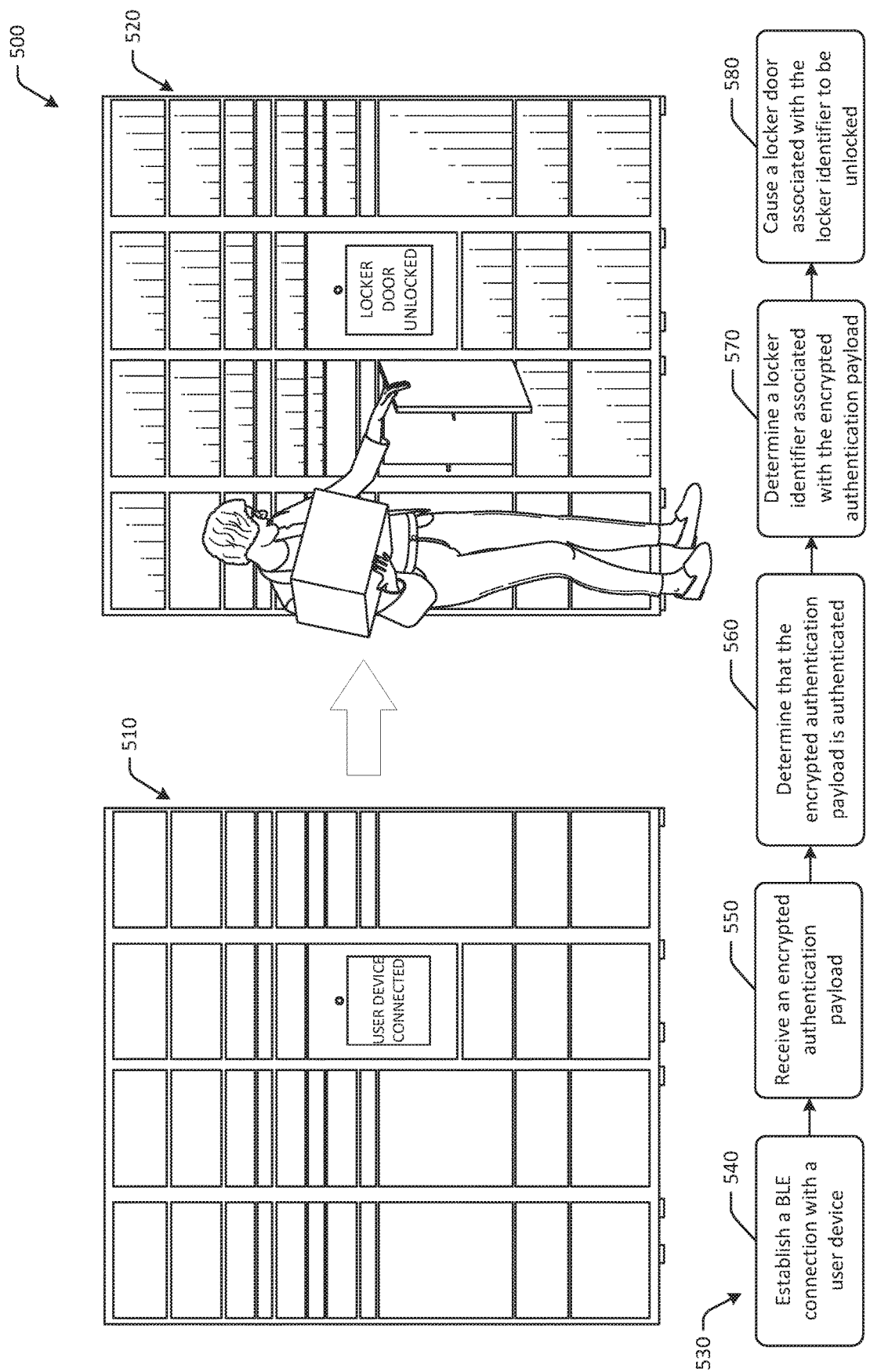
FIG. 5 is a hybrid schematic illustration of an example use case and process flow for autonomous device authentication and compartment unlocking in accordance with one or more example embodiments of the disclosure.

FIG. 5 is a hybrid schematic illustration of an example use case and process flow 500 for autonomous device authentication and compartment unlocking in accordance with one or more example embodiments of the disclosure. While example embodiments of the disclosure may be described in the context of lockers and smartphones, it should be appreciated that the disclosure is more broadly applicable to any type of compartment and user device, as well as user device-to-user device authentication. Some or all of the blocks of the process flows in this disclosure may be performed in a distributed manner across any number of devices. Some of the data flow or operations may be optional and may be performed in a different order. FIG. 5 may be an example data and operation flow during a locker approach and device authentication process.

In FIG. 5, a locker system may authenticate a user device using an authentication payload received from the user device over a Bluetooth Low Energy connection. After authentication, the locker system may provide access to a particular compartment, such as a locker, by unlocking or opening a compartment door. The user device discussed with respect to FIG. 5 may be the same user device discussed with respect to FIGS. 1-4, and the locker system may be the locker system discussed with respect to FIGS. 1-4.

As illustrated in FIG. 5, at a first instance 510, a locker system may detect and/or connect to a user device. The connection may be a Bluetooth Low Energy connection and may occur as the user device approaches the locker system. At a second instance 520, the locker system may receive an authentication payload, decrypt the authentication payload, and provide access to the locker associated with the authentication payload. The user may therefore remove the contents of the locker without having to interact with the user device or the locker system. Once the locker door is closed, the locker system may determine that the locker state is an unoccupied state, such that another package or delivery can be placed in the locker.

To autonomously authenticate the user device and unlock the locker or other compartment, the locker system may implement a process flow 530. At block 540, the locker system may establish a Bluetooth Low Energy connection with a user device. For example, a controller at the locker system may be used to establish a connection with the user device. A Bluetooth Low Energy peripheral device at the locker system may emit beacons that may be received and used by the user device to identify the Bluetooth Low Energy peripheral device, and to request to connect to the Bluetooth Low Energy peripheral device. The locker system may receive the connection request and accept the request to establish a connection with the user device.

At block 550, the locker system may receive an encrypted authentication payload. For example, the locker system controller may receive an encrypted authentication payload from the connected user device. The authentication payload may include information that allows the locker system to determine which locker is to be unlocked after authentication.

At block 560, the locker system may determine that the encrypted authentication payload is authenticated. For example, the locker system controller may decrypt the authentication payload and may determine that the user device is authorized to access a certain locker. Because the locker system may be offline, the locker system may decrypt the authentication payload locally, and may determine whether the decrypted value matches a predetermined value. For example, the authentication payload may be a token, and the locker system may determine whether a matching token is present in a set of expected token values. If there is a match, the locker system may determine that the authentication payload is authenticated.

At block 570, the locker system may determine a locker identifier associated with the encrypted authentication payload. For example, the locker system controller may determine a locker identifier associated with the authentication payload. In some instances, the locker identifier may be received from the user device and/or the delivery person device. In other instances, the authentication payload may be associated with a particular locker identifier in local memory at the locker system.

At block 580, the locker system may cause a locker door associated with the locker identifier to be unlocked. For example, the locker system controller may cause the locker door that is associated with the locker identifier to be opened or unlocked. When the door is closed, the locker system controller may cause the door to be locked again, and a state associated with the locker identifier may be updated.

Figure 6:
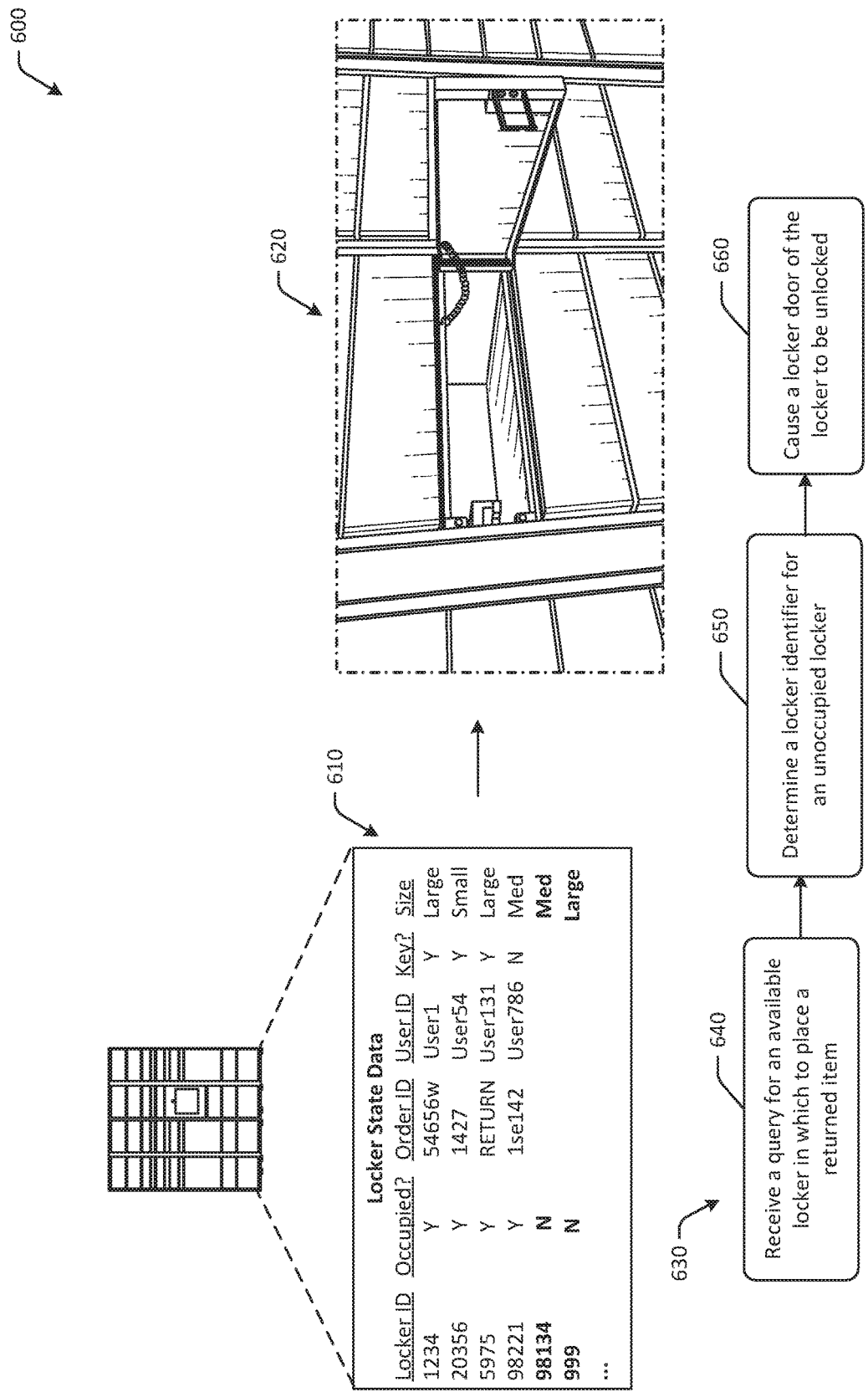
FIG. 6 is a hybrid schematic illustration of an example use case and process flow for locker state tracking and automated device communication in accordance with one or more example embodiments of the disclosure.

FIG. 6 is a hybrid schematic illustration of an example use case and process flow 600 for locker state tracking and automated device communication in accordance with one or more example embodiments of the disclosure. While example embodiments of the disclosure may be described in the context of lockers and user devices, it should be appreciated that the disclosure is more broadly applicable to any type of compartment and user device, as well as user device-to-user device authentication. Some or all of the blocks of the process flows in this disclosure may be performed in a distributed manner across any number of devices. Some of the data flow or operations may be optional and may be performed in a different order.

As illustrated in FIG. 6, a locker system may track states of individual lockers, thereby providing the ability not only for new deliveries to be placed in available or unoccupied lockers, but also for users to place items in unoccupied lockers, such as returned items, items for third parties to pick up, and so forth.

A locker system controller or computer system may therefore determine locker state data 610. The locker state data may include, for example, locker identifiers, an indication of whether the locker is occupied, an order identifier associated with a package in an occupied locker, a user account identifier associated with a package, an indication of whether an access credential or key is stored at the locker system (that can be used to authenticate a token received from a user device), a locker size value, and so forth. Other embodiments may include additional, fewer, or different data. As illustrated in FIG. 6, in some instances, a key may not be stored locally at the locker system, such as the key for locker ID 98221. In such instances, the locker system may use a current time or another process to decrypt an authentication payload received from a user device.

To accept packages or deliveries from user devices, the locker system may implement a process flow 630. At block 640, the locker system may receive a query for an available locker in which to place a returned item, or any other type of delivery or item. The locker system may optionally determine a size of the returned item. For example, the locker system may query a database of historical deliveries at the locker system, and may determine a locker size in which the package was initially delivered. In another example, the locker system may present a prompt at a display or at the user device. At block 650, the locker system may determine a locker identifier for an unoccupied locker using the size. For example, the locker system may determine unoccupied lockers using the locker state data 610, and may determine whether any of the unoccupied lockers are of suitable size. In some instances, the user device may receive locker state data from the locker system (e.g., the Bluetooth Low Energy peripheral device at the locker system), where the locker state data indicates a locker that is unoccupied. At block 660, the locker system may cause a locker door of the locker to be unlocked. If a locker of the correct size is available and unoccupied, the locker system may unlock the locker door 620, as illustrated in FIG. 6. The locker system may then determine that the locker door was closed, and may update the locker state to indicate that the contents of the locker are to be picked up by a delivery person (such as locker 5975). In some embodiments, the user device may send a notification of a return to a server, as the locker system may be an offline locker system.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
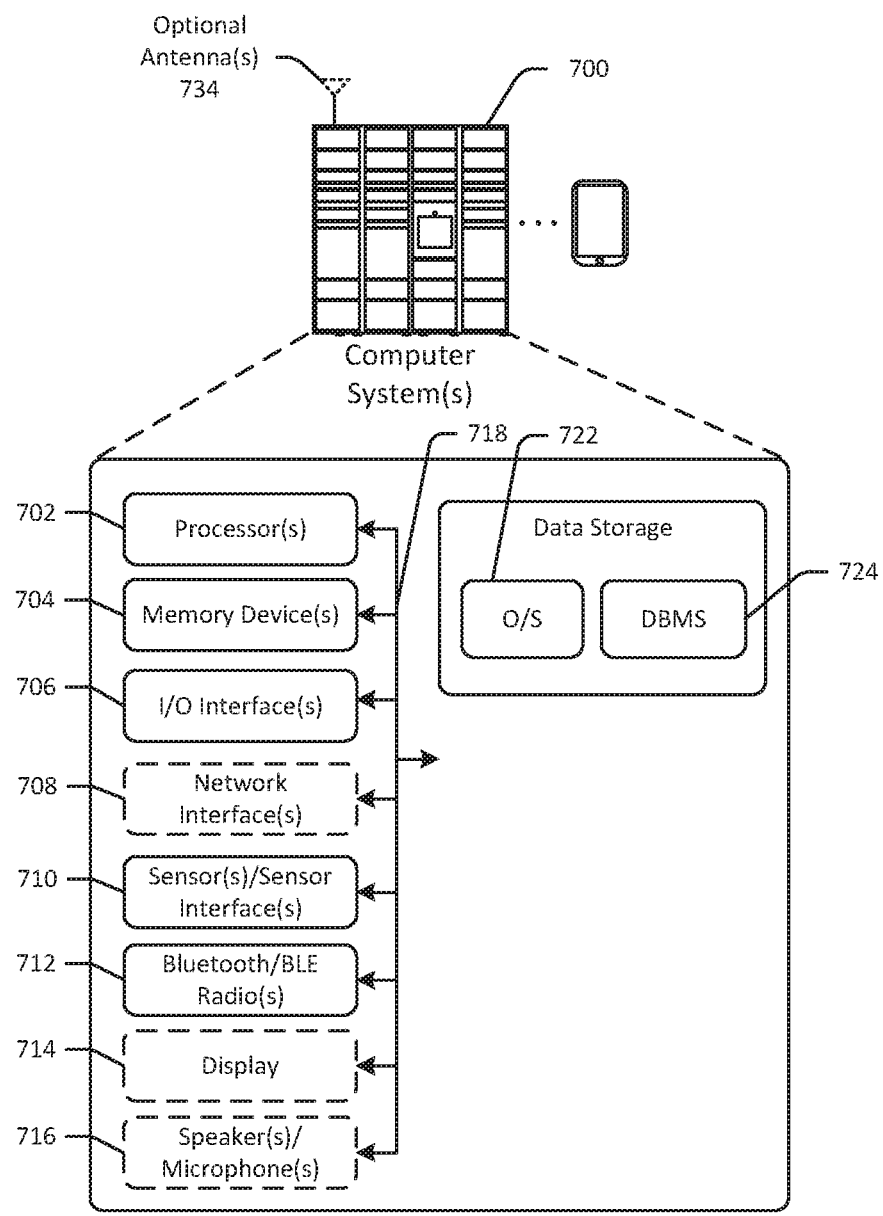
FIG. 7 is a schematic block diagram of an illustrative computer system in accordance with one or more example embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the locker system(s) and/or user device(s) of FIGS. 1-6.

The computer system(s) 700 may be configured to communicate with one or more servers, user devices, or the like. The computer system(s) 700 may be an offline computer system that is not connected to the Internet, and may be configured to control one or more operations of a locker system, such as unlocking and/or opening locker doors.

The computer system(s) 700 may optionally be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. In some embodiments, the computer system(s) 700 may only be configured to communicate using a Bluetooth and/or Bluetooth Low Energy connection, or another suitable personal area network.

In an illustrative configuration, the computer system(s) 700 may include one or more processors (processor(s)) 702, one or more memory devices 704 (also referred to herein as memory 704), one or more input/output (I/O) interface(s) 706, one or more optional network interface(s) 708, one or more sensor(s) or sensor interface(s) 710, one or more Bluetooth/Bluetooth Low Energy Radio(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more optional antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the 0/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, Bluetooth Low Energy, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 734 may include any suitable type of antenna depending, for example, on the communications protocols used to transmit or receive signals via the antenna (e) 734. Non-limiting examples of suitable antennae may include directional antennae, non-directional antennae, dipole antennae, folded dipole antennae, patch antennae, multiple-input multiple-output (MIMO) antennae, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The Bluetooth/Bluetooth Low Energy Radio(s) 712 may include any suitable radio component(s) for—in cooperation with the antenna(e) 734—transmitting or receiving radio frequency (RF) signals in the bandwidth and/or channels corresponding to the communications protocols utilized by the computer system(s) 700 to communicate with other devices. The Bluetooth/Bluetooth Low Energy Radio(s) 712 may include hardware, software, and/or firmware for modulating, transmitting, or receiving—potentially in cooperation with any of antenna(e) 734—communications signals according to any of the communications protocols discussed above including, but not limited to, one or more Bluetooth protocols, one or more Bluetooth Low Energy protocols, or another suitable personal area network protocol or standard. The Bluetooth/Bluetooth Low Energy Radio(s) 712 may further include hardware, firmware, or software for receiving GNSS signals. The Bluetooth/Bluetooth Low Energy Radio(s) 712 may include any known receiver and baseband suitable for communicating via the communications protocols utilized by the computer system(s) 700. The Bluetooth/Bluetooth Low Energy Radio(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    receiving, by a computer system at an offline locker system, an order identifier for an order that is to be picked up at the offline locker system, wherein the order identifier is received via a Bluetooth connection to a delivery user device, and wherein the offline locker system comprises a Bluetooth Low Energy peripheral device;
    determining, by the computer system, a locker identifier for a locker in which a package associated with the order is placed;
    determining, by the computer system, an encrypted temporal authentication key for the order identifier, wherein the encrypted authentication token can be used to access the locker;
    receiving, by a user device, an order pickup notification indicating that the order identifier is ready for pickup at the offline locker system, the order pickup notification comprising (i) an identifier associated with the Bluetooth Low Energy peripheral device, and (ii) geofence data associated with a location of the offline locker system;
    monitoring, by the user device, a location of the user device;
    determining, by the user device, that the user device is within a predetermined distance of the offline locker system using the geofence data;

triggering, by the user device, a software application at the user device, wherein the software application causes the user device to scan for the identifier associated with the Bluetooth Low Energy peripheral device;
determining, by the user device, that the Bluetooth Low Energy peripheral device is available for a connection;
establishing, by the user device, a connection with the Bluetooth Low Energy peripheral device;
generating, by the user device, the encrypted temporal authentication key;
sending, by the user device, a generic attribute characteristic to the Bluetooth Low Energy peripheral device, wherein the generic attribute characteristic comprises the encrypted temporal authentication key;
determining, by the computer system, that the user device is authenticated using the encrypted temporal authentication key; and
causing, by the computer system, a locker door of the locker to be unlocked.

2. The method of claim 1, further comprising:
determining, by the computer system, that the locker door is closed;
determining, by the computer system, that the delivery user device is connected to the computer system; and
sending, by the computer system, a notification indicating that the package has been picked up.

3. The method of claim 1, wherein generating, by the user device, the encrypted temporal authentication key comprises generating, by the user device, the encrypted temporal authentication key using a salt value, a user account identifier, an order identifier, and a current time.

4. The method of claim 1, further comprising:
receiving, by the user device, a beacon from a nearby Bluetooth Low Energy peripheral device after determining that the user device is within the predetermined distance of the offline locker system;
determining, by the user device and using the beacon, that the nearby Bluetooth Low Energy peripheral device is the Bluetooth Low Energy peripheral device; and
disconnecting, by the user device, from the Bluetooth Low Energy peripheral device before confirmation of authentication is received.

5. A method comprising:
receiving, by a user device comprising one or more computer processors coupled to memory, an order pickup notification comprising the identifier, the order pickup notification indicating that an order is ready for pickup, and wherein the identifier is associated with a target Bluetooth Low Energy peripheral device;
monitoring a location of the user device;
determining that the user device is within a range of the Bluetooth Low Energy peripheral device;
causing the user device to scan for the identifier;
receiving a beacon from a Bluetooth Low Energy peripheral device;
determining, by the user device using the beacon and the identifier, that the Bluetooth Low Energy peripheral device is the target Bluetooth Low Energy peripheral device;
establishing a connection with the target Bluetooth Low Energy peripheral device; and
sending a signal to the target Bluetooth Low Energy peripheral device to implement an action, wherein the signal comprises a resource identifier, and wherein the target Bluetooth Low Energy peripheral device controls access to a plurality of resources, and uses the resource identifier to identify a resource of the plurality of resources at which to implement the action.

6. The method of claim 5, wherein the action comprises providing access to the resource identified during a connection process between the user device and the target Bluetooth Low Energy peripheral device.

7. The method of claim 5, wherein sending the signal to the target Bluetooth Low Energy peripheral device to implement the action comprises sending a generic attribute characteristic to the target Bluetooth Low Energy peripheral device.

8. The method of claim 5, further comprising:
initiating a mobile application in background mode, wherein the mobile application is configured to scan for the identifier, wherein a user interface associated with the mobile application is not presented at the user device while the mobile application is in the background mode.

9. The method of claim 5, further comprising:
determining a geofence region corresponding to the Bluetooth Low Energy peripheral device wherein determining that the user device is within a range of the Bluetooth Low Energy peripheral device comprises,
determining that the user device is within the geofence region.

10. The method of claim 5, further comprising:
determining a beacon region corresponding to the Bluetooth Low Energy peripheral device, wherein determining that the user device is within a range of the Bluetooth Low Energy peripheral device comprises,
determining that the user device is within the beacon region.

11. The method of claim 5, further comprising:
automatically disconnecting from the target Bluetooth Low Energy peripheral device after sending the generic attribute characteristic.

12. The method of claim 5, further comprising:
determining the encrypted authentication token using a current time, wherein the target Bluetooth Low Energy peripheral device is configured to use the current time to authenticate the encrypted authentication token.

13. The method of claim 5, wherein the target Bluetooth Low Energy peripheral device is coupled to a controller of a locker system, and wherein the action comprises unlocking a locker door associated with the order.

14. The method of claim 5, wherein the user device is not paired with the Bluetooth Low Energy peripheral device, and wherein the target Bluetooth Low Energy peripheral device is an offline device.

15. The method of claim 5, further comprising:
receiving locker state data from the target Bluetooth Low Energy peripheral device, the locker state data indicative of a locker that is unoccupied.

16. A system comprising:
memory configured to store computer-executable instructions; and
at least one computer processor configured to access the memory and execute the computer-executable instructions to:
receive, by a user device comprising one or more computer processors coupled to memory, an order pickup notification comprising the identifier, the order pickup notification indicating that an order is ready for pickup, and wherein the identifier is associated with a target Bluetooth Low Energy peripheral device;
monitor a location of the user device;

determine that the user device is within a range of the Bluetooth Low Energy peripheral device;

receive a beacon from a Bluetooth Low Energy peripheral device;

determine, using the beacon and the identifier, that the Bluetooth Low Energy peripheral device is the target Bluetooth Low Energy peripheral device;

establish a connection with the target Bluetooth Low Energy peripheral device; and send a signal to the target Bluetooth Low Energy peripheral device to implement an action, wherein the signal comprises a resource identifier, and wherein the target Bluetooth Low Energy peripheral device controls access to a plurality of resources, and uses the resource identifier to identify a resource of the plurality of resources at which to implement the action.

17. The system of claim 16, wherein the at least one processor is further configured to access the memory and execute the computer-executable instructions to:

initiate a mobile application in background mode, wherein the mobile application is configured to scan for the identifier, wherein a user interface associated with the mobile application is not presented at the user device while the mobile application is in the background mode.

18. The system of claim 16, wherein the action comprises providing access to a resource identified during a connection process between the user device and the target Bluetooth Low Energy peripheral device.

19. The system of claim 16, wherein the at least one processor is further configured to access the memory and execute the computer-executable instructions to:

determine a beacon region corresponding to the Bluetooth Low Energy peripheral device, wherein to determine that the user device is within a range of the Bluetooth Low Energy peripheral device includes, determine that the user device is within the beacon region; and initiate a mobile application in background mode, wherein the mobile application is configured to identify available Bluetooth Low Energy peripheral devices.

* * * * *